United States Patent [19]

Komoto

[11] 4,314,749
[45] Feb. 9, 1982

[54] LENS MOUNT BARREL FOR PHOTOGRAPHING WITH FLASH LAMP

[75] Inventor: Shinsuke Komoto, Tokyo, Japan

[73] Assignee: Asahi Kogaku Kogyo Kabushiki Kaisha, Tokyo, Japan

[21] Appl. No.: 171,782

[22] Filed: Jul. 24, 1980

[30] Foreign Application Priority Data

Jul. 25, 1979 [JP] Japan .................................. 54-94596

[51] Int. Cl.³ .......................... G03B 15/03; G03B 9/02
[52] U.S. Cl. ...................................... 354/139; 354/196
[58] Field of Search ...................... 354/139, 149, 196

[56] References Cited

U.S. PATENT DOCUMENTS

| | | | |
|---|---|---|---|
| 2,989,908 | 6/1961 | Bolsey | 354/196 |
| 3,447,441 | 6/1969 | Ort | 354/196 |
| 3,633,483 | 1/1972 | Nagashima | 354/196 |
| 3,680,459 | 8/1972 | Okura | 354/196 |
| 3,906,529 | 9/1975 | Filipovich | 354/196 |
| 4,141,636 | 2/1979 | Shimojima | 354/196 |
| 4,227,791 | 10/1980 | Komoto | 354/196 |

Primary Examiner—Donald A. Griffin
Attorney, Agent, or Firm—Sughrue, Mion, Zinn, Macpeak and Seas

[57] ABSTRACT

A lens mount barrel for flash photographing in which the relative positions of a flash source and a photographing lens are made variable and the photographic magnification or distance value can be set to preferred values within a general sequence of frequently-used numbers on a stopdown scale while simultaneously a click stop of the magnification scale is accomplished by a click stop on the stopdown scale. An operational sleeve and a stopdown sleeve cooperate with one another for focusing. A click stop mechanism is provided in the operational sleeve for click stopping the stopdown sleeve at positions corresponding to predetermined positions on the magnification scale.

7 Claims, 7 Drawing Figures

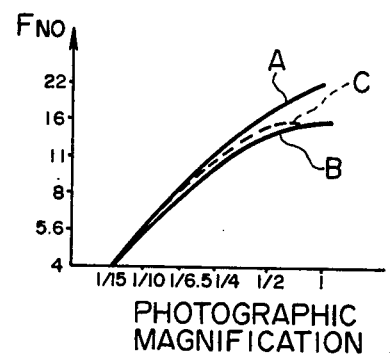
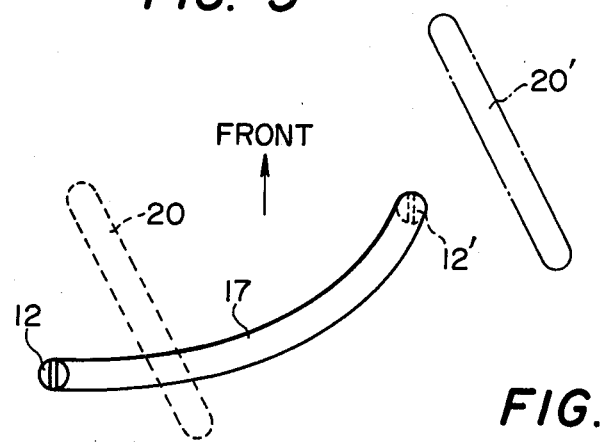
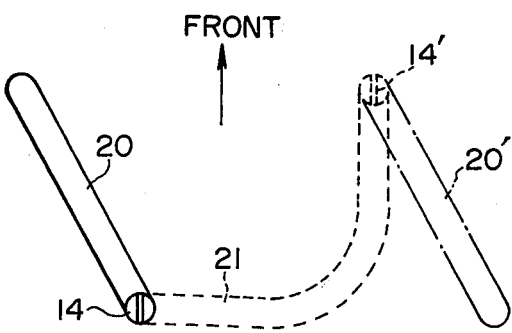
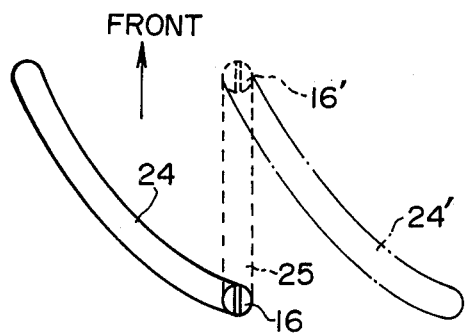

LENS MOUNT BARREL FOR PHOTOGRAPHING WITH FLASH LAMP

BACKGROUND OF THE INVENTION

The present invention relates to a lens mount barrel for photographing with a flash lamp in which an operational sleeve for focusing cooperates with a stopdown sleeve.

Generally, a stopdown sleeve is mounted coaxially surrounding a lens mount barrel and is click-stopped at positions where its stopdown scale coincides with a suitable index so that the positional relationship is firmly maintained.

A "flashmatic lens" is also known in which an operational sleeve and a stopdown sleeve are coupled to each other in a lens mount barrel with the two sleeves integrally rotatable together so that the stopdown value may be automatically adjusted to a suitable value by rotation of the operational sleeve for photographing with a flash bulb or electronic strobe. In such a flashmatic lens, a photographic magnification or a distance to the object is adjusted to a value within a sequence of numbers such as ½ and ¼ (which is standardized in the Japanese Industrial Standards with respect to sequences of numbers for photographic distance scales) by rotating the operational sleeve for flash photographing. The stopdown value used is automatically determined on the stopdown scale by the relationship of the guide numbers. The stopdown value is not an exact value in the sequence of f-stop numbers generally used such as 2, 2.8, 4, 5.6, 8, . . . and is, for example, read out as a value near 4 but falling between 4 and 5.6. The stopdown values are usually supplied in the form of a data table or the like. To accomplish a flash photographing operation, the photographer must estimate the proper stopdown value from the table which gives both magnification and stopdown values. In some lens constructions, an interlock mechanism has been provided so as to prevent accidental displacement from a position where the magnification or distance scale is aligned with the index. In this case, after the magnification or distance scale has been suitably set, it is required that the scale be locked after carefully adjusting the index.

SUMMARY OF THE INVENTION

In view of the above noted defects, the present invention provides a lens mount barrel suited for flash photographing in which the relative positions of the flash light source and the lens are made variable and the photographic magnification can be set to a value within a general sequence of frequently-used numbers on the stopdown scale while at the same time a click stop of the magnification or distance scale is accomplished by a click stop on the stopdown scale.

BRIEF DESCRIPTION OF THE DRAWINGS

In the drawings:

FIG. 4 shows relationships between the photographic magnification and f number when the positions of the discharge tube and the lens are varied; and FIGS. 5, 6 and 7 illustrate the movements of primary advance slits and pins of the lens barrel.

DETAILED DESCRIPTION OF THE INVENTION

The present invention will hereinafter be described in greater detail with reference to the accompanying drawings.

Figure 1:
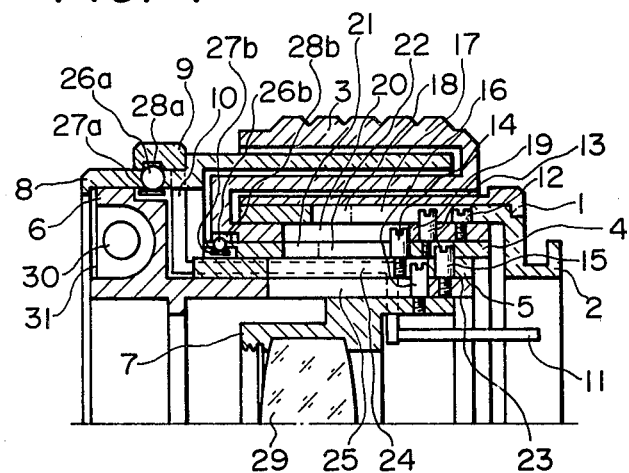
FIG. 1 is a cross-sectional view showing a retracted state of a lens barrel embodying the present invention.
Figure 2:
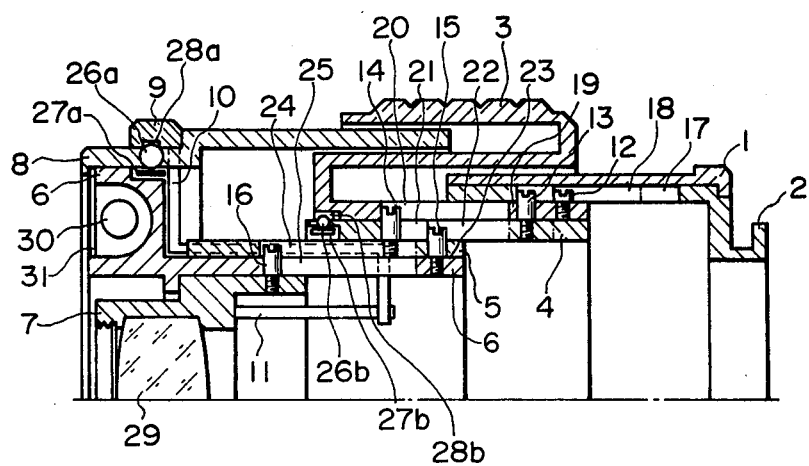
FIG. 2 is a cross-sectional view showing an extended state of the lens barrel shown in FIG. 1.

In FIGS. 1 and 2, reference numeral 1 designates a decorative sleeve covering an advance slot or groove 17 and a linear guide slot 18 formed in a mount barrel 2 which includes a mounting end portion for attachment to a camera body (not shown). An operational sleeve 3 is provided with an advance slot 20 for transmitting rotational motion and a circumferential slot 19 therein. A pin 12 rigidly attached to the operational sleeve 3 engages the advance slot 17. A linear moving or advance sleeve 4 has rigidly attached thereto a pin 13 which is engaged in the circumferential slot 19 and at the same time is engaged in the linear guide slot 18. The advance sleeve 4 can move together with the operational sleeve 3 in the direction of the optical axis but may not rotate. The advance sleeve 4 is provided with an advance slot 21 and a linear guide slot 22.

A rotational sleeve 5 is provided with an advance slot 24, a circumferential slot 23 and a rigidly mounted pin 14 which engages with the advance slots 21 and 20. A linear advance sleeve 6 is provided with a linear guide slot 25. A pin 15 rigidly attached to the linear advance sleeve 6 is engaged in the circumferential slot 23 and the linear moving guide slot 22.

Disposed in a front end portion of the linear advance sleeve 6 are a discharge tube 30 used for flash photographing and a protective shield plate 31 provided for chromatic temperature compensation of light emitted from the discharge tube 30 and for enhancing the light convergency thereof. A lens frame 7 has a pin 16 attached thereto which is engaged with the linear guide slot 25 and the advance slot 24. An index 34 for a magnification scale on the operational sleeve 3 and a stopdown scale 33 on a stopdown sleeve 9, which is coupled to the rotational sleeve 5, is marked on an indicating sleeve 8 which is coupled to the linear advance sleeve 6. Click balls 26a and 26b positioned in the indicating sleeve 8 and the linear advance sleeve 4, respectively, are urged toward click recesses 28a and 28b formed in the stopdown sleeve 9 and the operational sleeve 3 by click springs 27a and 27b, respectively, to thereby click-stop the stopdown sleeve 9 and the operational sleeve 3. Reference numeral 10 denotes a stopdown cooperating rod 11 which operates a stop diaphragm rotating rod by movement of the stopdown sleeve 9. The rotation of the rod 11 is translated into a corresponding stopdown value by a cam mechanism (not shown) of a type well-known in the art.

In the graph of FIG. 4, curve A shows the relationship between photographic magnification and the f number with a lens 29 positioned behind the discharge tube 30 as shown in FIG. 1 for a range of photographic magnification up to a magnification of one. Curve B in FIG. 4 shows this relationship with the lens 29 positioned below the discharge tube 30 as shown in FIG. 2 when the photographic magnification is increased. Curve C in FIG. 4 is a plot constructed by connecting points of the magnification scale 32 and corresponding points of the stopdown scale 33 between curves A and B.

Figure 3:
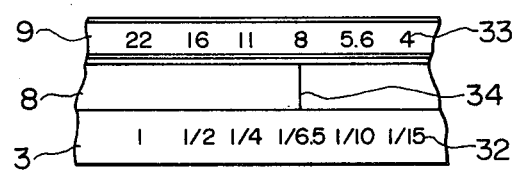
FIG. 3 is a fragmentary plan view showing a relationship between the magnification scale and the stopdown scale.

The operation of the thus constructed lens barrel will be described. When the operational sleeve 3 is rotated in the advancing direction, the pin 12 attached to the operational barrel 3 is rotated together therewith and the pin 12 is moved to a position 12' while the advance slot 20 is moved to a position 20' as shown in FIG. 5 so that the operational sleeve 3 is advanced corresponding to the longitudinal length of the advance slot 17. In this case, rotation of the operational sleeve 3 is not prevented because the pin 13 is engaged with the circumferential slot 19. The pin 14 attached to the rotational sleeve 5 is engaged with the advance slots 21 and 20 and is advanced to a position 14' corresponding to the amount of forward movement of the advance slot 21. During this movement, the advance slot 20 is moved to a position 21' as shown in FIG. 6. Next, the rotation of the rotational sleeve 5 is transmitted to the pin 16 through the advance slot 24. Since the pin 16 is engaged with the linear advance guide slot 25 of the linear advance sleeve 6, as shown in FIG. 7, by the rotation of the advance slot 24 to 24' the pin 16 is advanced to a position 16' corresponding to the amount of forward movement of the advance slot 24. That is, the lens frame 7 to which the pin 16 is attached is advanced by the sum of the forward movements of the advance slot 24 and the advance slot 21. The linear advance sleeve 6 is linearly advanced by the engagement of the pin 15 with the linear advance guide slot 22. The lens frame 7 is linearly advanced by the engagement of the pin 16 with the linear advance guide slot 25. When the operational sleeve 3 and the stopdown sleeve 9 cooperate with each other, for instance, the value f8 on the stopdown scale 33 is aligned with the index 34 as shown in FIG. 3 while the click recess 28a is at a position adjacent the click ball 26a to thereby achieve a click stop. If the configurations of the advance slots 17, 21 and 24 are designed so that the positions of the discharge tube 30 and the lens 29 are varied according to the graph C shown in FIG. 4, the value 1/6.5 on the magnification scale 32 can be aligned with the index 34 corresponding to the value of f8. The click stop of the stopdown sleeve 9 also serves as a click stop for the operational sleeve 3. Since each stopdown value has a corresponding magnification scale value, when either of the operational sleeve 3 or the stopdown sleeve 9 is adjusted relative to the index 34, the other is automatically aligned thereto whereby the troublesome operation in which the click stop operation must be carried out without the magnification scale 32 being indicated is eliminated.

In the above described embodiment, the operational sleeve 3 and the stopdown sleeve 9 cooperate with each other and no release mechanism therefor is disclosed in the embodiment described. However, if desired, the stopdown sleeve 9 can be moved in the longitudinal direction with respect to the optical axis and the engagement between the cooperating rod 10 and the rotation sleeve 5 released to thereby release the cooperation of the operational sleeve 3 and the stopdown sleeve 9 while simultaneously the click stop is also released. In case such cooperation between the operational sleeve 3 and stopdown sleeve 9 is released and manual photographing is carried out in which the magnification scale or the distance scale and the stopdown scale values are arbitrarily selected, if desired, it is possible to further employ a click stop mechanism including the click spring 27b, click ball 26b and click recess 28b to thereby click stop both the operational sleeve 3 and stopdown sleeve 9 regardless of whether they are acting in cooperation or non-cooperation.

In case of usage of different ASA sensitivity films or different guide number discharge tubes, for example, when a film having twice the sensitivity or a discharge tube having twice the guide number than that used in the example illustrated in FIG. 3, the stopdown sleeve 9 is rotated from f8 to f11 after which cooperation is re-established so that the same operational effect is obtained.

According to the present invention, it is possible to adjust the operational sleeve to a desired magnification while simultaneously adjusting the stopdown value. Therefore, it is possible to quickly set a desired f number used and at the same time it is unnecessary to carefully adjust the magnification to the index as was required in the prior art lens barrel. Moreover, it is possible to prevent the setting from being accidentally changed. It is possible to quickly adjust or set the photographic magnification or distance. Moreover, the click stop mechanism also serves as an interlock mechanism.

What is claimed is:

1. A flash photographing lens mount barrel comprising: a mount barrel, said mount barrel having a first advance slot and a first linear guide slot formed therein and said mount barrel having a mounting portion adapted for attachment to a camera body; an operational sleeve having a second advance slot for transmitting rotational motion and a first circumferential slot formed therein; a first pin rigidly attached to said operational sleeve and engaged in said first advance slot; an advance sleeve having a second advance slot and a second linear guide slot formed therein; a second pin rigidly attached to said advance sleeve, said second pin being engaged in said first circumferential slot and in said first linear guide slot, said advance sleeve moving together with said operational sleeve in the direction of the optical axis of said barrel without rotation; a rotational sleeve having formed therein a third advance slot and a second circumferential slot; a third pin rigidly attached to said rotational sleeve, said third pin being engaged with said first and second advance slots; a linear moving sleeve having formed therein a third linear guide slot; a fourth pin rigidly attached to said linear moving sleeve engaged in said second circumferential slot and said second linear slot; a discharge tube disposed in a front end portion of said linear advance sleeve; a lens frame; a fifth pin rigidly attached to said lens frame and engaged with said third linear guide slot and said third advance slot; an index marked upon said operational sleeve; a stopdown sleeve coupled to said rotational sleeve, a stopdown scale being marked upon said stopdown sleeve adjacent said index; an indicating sleeve coupled to said linear advance sleeve; a first click ball operationally positioned in said indicating sleeve and a second click ball operationally positioned in said linear advance sleeve; and first and second click springs for biasing said click balls, said first click ball click stopping said stopdown sleeve and said second click ball click stopping said operational sleeve.

2. The flash photographing lens mount barrel according to claim 1 further comprising a stopdown cooperating rod for operating a stop diaphragm, said stopdown cooperating rod being rigidly coupled to said stopdown sleeve.

3. The flash photographing lens mount barrel according to claim 1 or 2 wherein said first, second and third advance slots are shaped so that the relative positions of said discharge tube and said lens are varied according to a predetermined function.

4. The flash photographing lens mount barrel according to claim 1 or 2 wherein said first, second and third advance slots are shaped so that the relative positions of said discharge tube and said lens are varied substantially in accordance with Graph C of FIG. 4 herein.

5. A flash photographing lens mount barrel comprising:

first rotatable means for adjusting a magnification value;

second rotatable means for adjusting a stop down value; and coupling means for providing a predetermined non-unity degree of rotational coupling between said first and second rotatable means whereby an angular rotation of one of said first and second rotatable means will result in a different angular rotation of the other of said first and second rotatable means, said predetermined degree of coupling being selected to maintain a desired relationship between said magnification and stop down values.

6. The flash photographing lens mount barrel as defined in claim 5, further comprising a click-stop mechanism engaging said first rotatable means for click-stopping said second rotatable means at positions corresponding to predetermined magnification values.

7. A flash photographing lens mount barrel as defined in claim 5, wherein said predetermined degree of coupling is non-linear.

* * * * *